(12) United States Patent
Tanaka

(10) Patent No.: US 8,850,502 B2
(45) Date of Patent: Sep. 30, 2014

(54) CONTENT REPRODUCTION DEVICE, CONTENT REPRODUCTION SYSTEM, AND CONTENT REPRODUCTION METHOD

(71) Applicant: Panasonic Corporation, Osaka (JP)

(72) Inventor: Toshiyuki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/921,487

(22) Filed: Jun. 19, 2013

(65) Prior Publication Data

US 2013/0347047 A1 Dec. 26, 2013

(30) Foreign Application Priority Data

Jun. 25, 2012 (JP) ................................. 2012-142385

(51) Int. Cl.
*H04N 7/173* (2011.01)
*H04N 21/234* (2011.01)
*H04N 21/236* (2011.01)
*H04N 21/654* (2011.01)

(52) U.S. Cl.
CPC ....... *H04N 21/654* (2013.01); *H04N 21/23424* (2013.01); *H04N 21/23611* (2013.01)
USPC .................. 725/110; 725/36; 725/95; 725/98

(58) Field of Classification Search
CPC .................. H04N 21/23424; H04N 21/23611
USPC ........................................ 725/95, 110, 98, 36
See application file for complete search history.

(56) References Cited

U.S. PATENT DOCUMENTS

| 6,043,851 | A | * | 3/2000 | Sawada et al. ................ 348/512 |
| 6,658,485 | B1 | * | 12/2003 | Baber et al. ................... 719/314 |
| 6,980,977 | B2 | | 12/2005 | Hoshi et al. |
| 7,136,571 | B1 | * | 11/2006 | Dagtas .......................... 386/269 |
| 8,437,408 | B2 | * | 5/2013 | Ogikubo et al. .......... 375/240.25 |
| 8,676,035 | B2 | * | 3/2014 | Vallone et al. ................ 386/291 |
| 2002/0083043 | A1 | | 6/2002 | Hoshi et al. |
| 2004/0190867 | A1 | * | 9/2004 | Roelens .......................... 386/68 |
| 2007/0121720 | A1 | | 5/2007 | Yamane et al. |
| 2009/0165067 | A1 | * | 6/2009 | Bruckman et al. ............. 725/110 |
| 2014/0101538 | A1 | * | 4/2014 | Style ............................. 715/234 |

FOREIGN PATENT DOCUMENTS

JP 2002-171507 6/2002

* cited by examiner

*Primary Examiner* — Pankaj Kumar
*Assistant Examiner* — Sahar Baig
(74) *Attorney, Agent, or Firm* — Wenderoth, Lind & Ponack, L.L.P.

(57) ABSTRACT

A content reproduction device including: an obtaining unit configured to obtain the content including plural segments on a per segment basis from a server through a communication network, each of the segments being assigned with a priority; and a reproduction controlling unit configured to reproduce the content on the per segment basis by displaying the content on a display device on the per segment basis, in which the reproduction controlling unit is configured to control reproduction of a target segment based on an amount of delay and a priority of the target segment, the amount of delay being a difference between a distributable position indicating a position of a latest segment distributable by the server and a first reproduction position in the content that is currently reproduced.

15 Claims, 21 Drawing Sheets

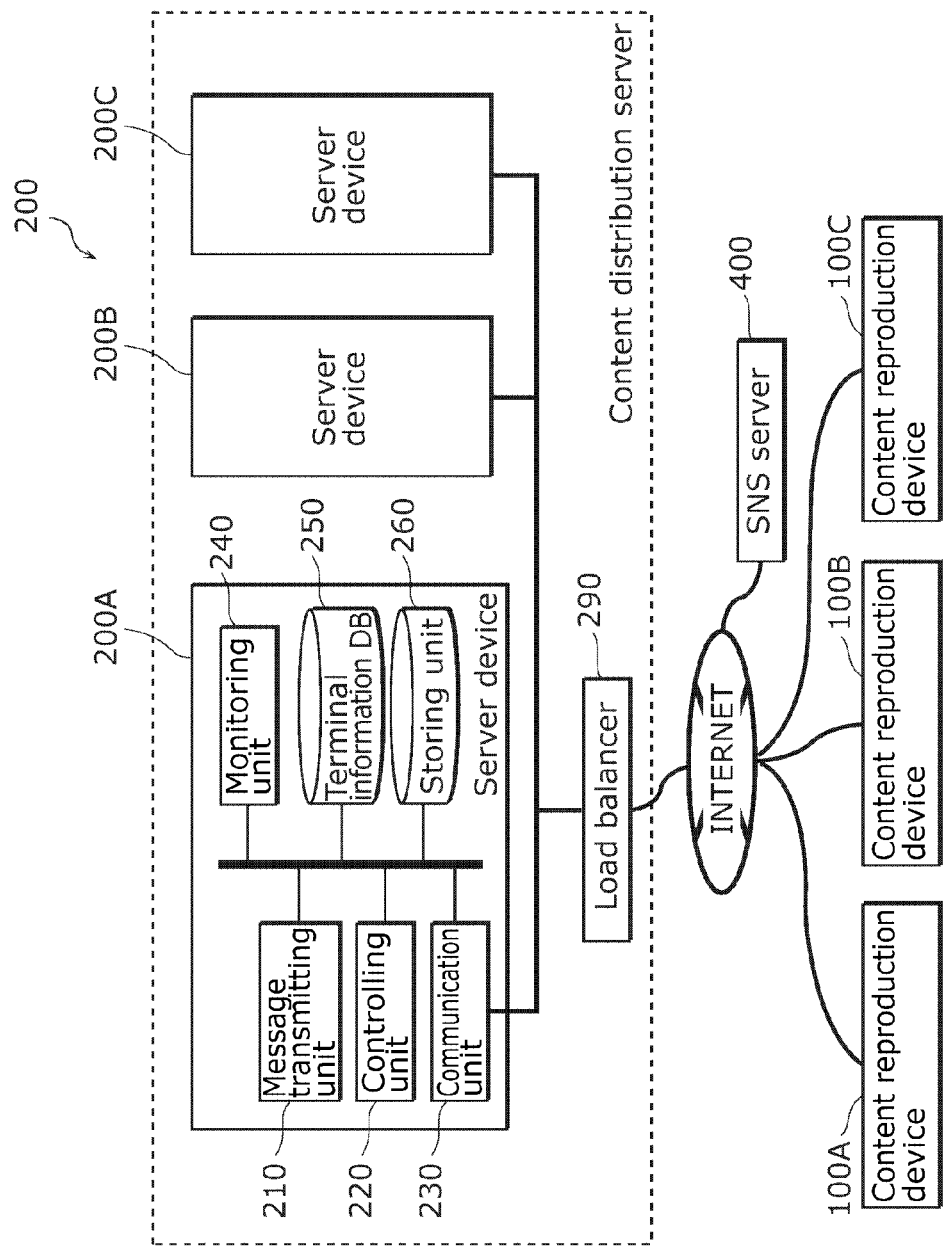

FIG. 4A

List of index files on a bit rate basis

```
#EXTM3U
#EXT-X-STREAM-INF:PROGRAM-ID=1,BANDWIDTH=1280000
http://example.com/low.m3u8
#EXT-X-STREAM-INF:PROGRAM-ID=1,BANDWIDTH=2560000
http://example.com/mid.m3u8
#EXT-X-STREAM-INF:PROGRAM-ID=1,BANDWIDTH=7680000
http://example.com/hi.m3u8
#EXT-X-STREAM-INF:PROGRAM-ID=1,BANDWIDTH=65000,CODECS="mp4a.40.5"
http://example.com/audio-only.m3u8
```

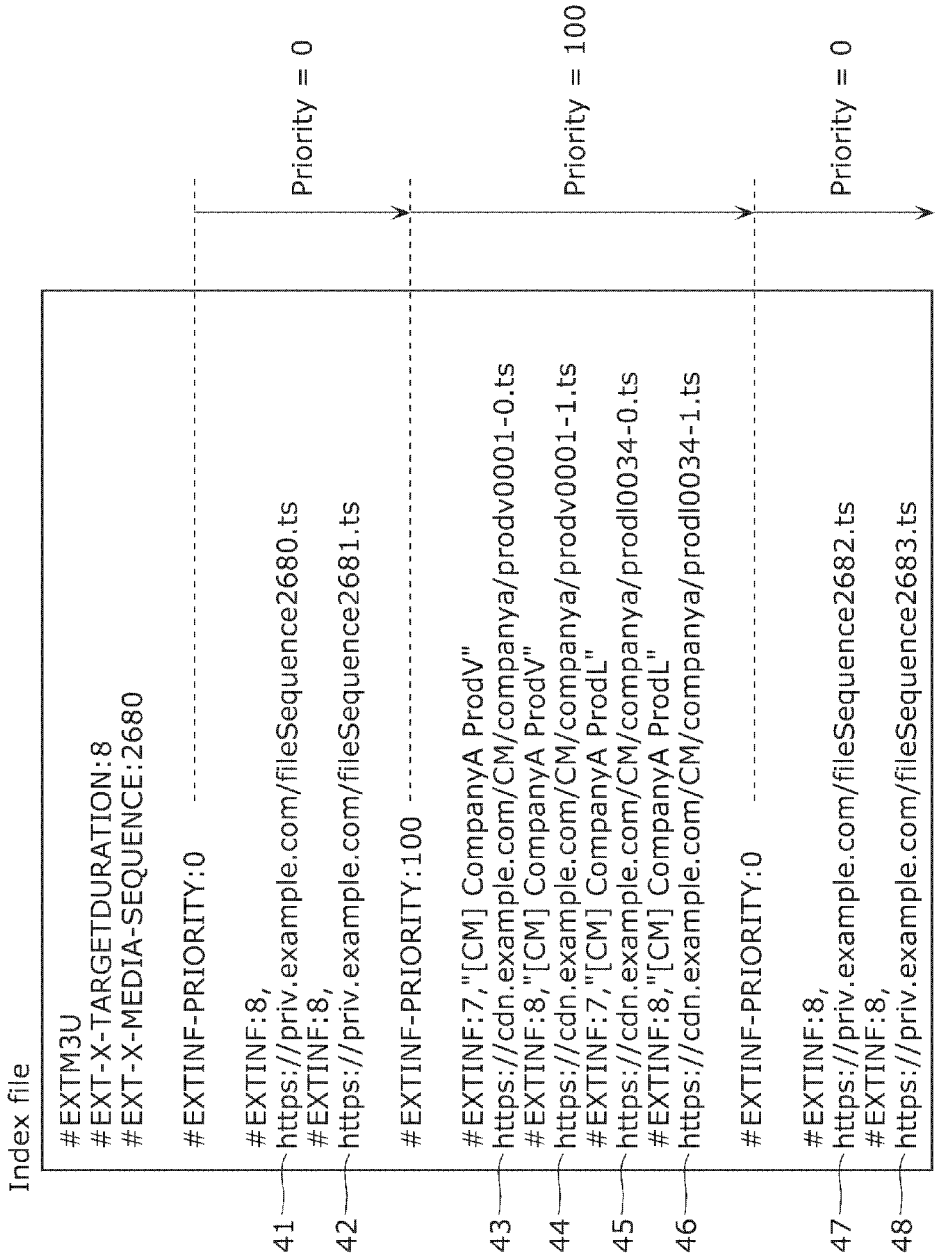

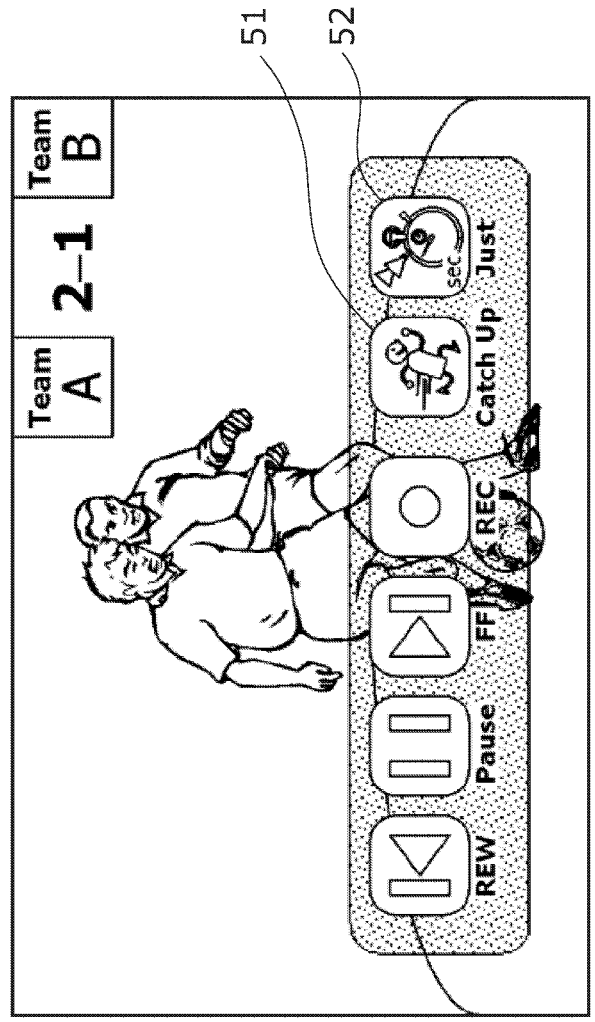

FIG. 9A

```
#EXTM3U
#EXT-X-TARGETDURATION:8
#EXT-X-MEDIA-SEQUENCE:2680

#EXTINF-PRIORITY:0

#EXTINF:8,
61 —— https://priv.example.com/fileSequence2680.ts
    #EXTINF:8,
62 —— https://priv.example.com/fileSequence2681.ts

#EXTINF-PRIORITY:100

#EXTINF:7,"[CM] CompanyA ProdV"
63 —— https://cdn.example.com/CM/companya/prodv0001-0.ts
    #EXTINF:8,"[CM] CompanyA ProdV"
64 —— https://cdn.example.com/CM/companya/prodv0001-1.ts
    #EXTINF:7,"[CM] CompanyA ProdL"
65 —— https://cdn.example.com/CM/companya/prodl0034-0.ts
    #EXTINF:8,"[CM] CompanyA ProdL"
66 —— https://cdn.example.com/CM/companya/prodl0034-1.ts

#EXTINF-PRIORITY:0

#EXTINF:8,
67 —— https://priv.example.com/fileSequence2686.ts
    #EXTINF:8,
68 —— https://priv.example.com/fileSequence2687.ts
    #EXTINF:8,
69 —— https://priv.example.com/fileSequence2688.ts
    #EXTINF:8,
70 —— https://priv.example.com/fileSequence2689.ts
```

FIG. 10A

```
#EXTM3U
#EXT-X-TARGETDURATION:8
#EXT-X-MEDIA-SEQUENCE:2684

#EXTINF-PRIORITY:0

#EXTINF:7,"[CM] CompanyA ProdL"
65 ─── https://cdn.example.com/CM/companya/prodl0034-0.ts
     #EXTINF:8,"[CM] CompanyA ProdL"
66 ─── https://cdn.example.com/CM/companya/prodl0034-1.ts

#EXTINF-PRIORITY:0

#EXTINF:8,
67 ─── https://priv.example.com/fileSequence2686.ts
     #EXTINF:8,
68 ─── https://priv.example.com/fileSequence2687.ts
     #EXTINF:8,
69 ─── https://priv.example.com/fileSequence2688.ts
     #EXTINF:8,
70 ─── https://priv.example.com/fileSequence2689.ts
     #EXTINF:8,
71 ─── https://priv.example.com/fileSequence2690.ts
     #EXTINF:8,
72 ─── https://priv.example.com/fileSequence2691.ts
     #EXTINF:8,
73 ─── https://priv.example.com/fileSequence2692.ts
     #EXTINF:8,
74 ─── https://priv.example.com/fileSequence2693.ts
```

FIG. 11A

```
#EXTM3U
#EXT-X-TARGETDURATION:8
#EXT-X-MEDIA-SEQUENCE:2689

#EXTINF-PRIORITY:0

#EXTINF:8,
70 —— https://priv.example.com/fileSequence2689.ts
    #EXTINF:8,
71 —— https://priv.example.com/fileSequence2690.ts
    #EXTINF:8,
72 —— https://priv.example.com/fileSequence2691.ts
    #EXTINF:8,
73 —— https://priv.example.com/fileSequence2692.ts
    #EXTINF:8,
74 —— https://priv.example.com/fileSequence2693.ts
    #EXTINF:8,
75 —— https://priv.example.com/fileSequence2694.ts
    #EXTINF:8,
76 —— https://priv.example.com/fileSequence2695.ts
    #EXTINF:8,
77 —— https://priv.example.com/fileSequence2696.ts
    #EXTINF:8,
78 —— https://priv.example.com/fileSequence2697.ts
    #EXTINF:8,
79 —— https://priv.example.com/fileSequence2698.ts
```

CONTENT REPRODUCTION DEVICE, CONTENT REPRODUCTION SYSTEM, AND CONTENT REPRODUCTION METHOD

CROSS REFERENCE TO RELATED APPLICATION

The present application is based on and claims priority of Japanese Patent Application No. 2012-142385 filed on Jun. 25, 2012. The entire disclosure of the above-identified application, including the specification, drawings and claims is incorporated herein by reference in its entirety.

FIELD

The present disclosure is related to a content reproduction device, a content reproduction system, and a content reproduction method for reproducing content obtained through a communication network.

BACKGROUND

Patent Literature (PTL) 1 discloses a display device which displays real-time content obtained through broadcasting waves and information content obtained through the Internet. As described above, real-time content such as sports broadcasting is generally obtained through the broadcasting waves. On the other hand, in general, information obtained through the Internet is not content itself but information including advertisements, accompanying information of the content, and others.

CITATION LIST

Patent Literature

[PTL 1] Japanese Unexamined Patent Application Publication No. 2002-171507

SUMMARY

Technical Problem

The present disclosure provides a content reproduction device which reproduces real-time content obtained through a communication network without causing a large amount of delay.

Solution to Problem

The content reproduction device according to the present disclosure is a content reproduction device for reproducing content, the device including: an obtaining unit configured to obtain the content including plural segments on a per segment basis from a server through a communication network, each of the segments being assigned with a priority; and a reproduction controlling unit configured to reproduce the content on the per segment basis by displaying the content obtained by the obtaining unit on a display device on the per segment basis, in which the reproduction controlling unit is configured to control reproduction of a target segment based on an amount of delay and a priority of the target segment, the amount of delay being a difference between a distributable position indicating a position of a latest segment distributable by the server and a first reproduction position in the content that is currently reproduced.

Advantageous Effects

The content reproduction device according to the present disclosure is capable of reproducing real-time content obtained through a communication network without causing a large amount of delay.

BRIEF DESCRIPTION OF DRAWINGS

These and other advantages and features of the disclosure will become apparent from the following description thereof taken in conjunction with the accompanying drawings that illustrate a specific embodiment of the present disclosure.

FIG. 3 is a block diagram showing a configuration of a content distribution server according to Embodiment 1.

FIG. 4A is a diagram showing a list of sources (URL) of index files on a bit rate basis in content distribution.

FIG. 4B is a diagram showing an example of information held in an index file.

FIG. 5C is a diagram showing an exemplary screen for prompting an operation to resolve the delay.

FIG. 9A is a diagram showing an index file at first time.

FIG. 10A is a diagram showing an index file at second time.

FIG. 11A is a diagram showing an index file at third time.

DESCRIPTION OF EMBODIMENTS

Hereinafter, details of non-limiting embodiments are described with reference to the drawings. It is to be noted that detailed descriptions beyond necessity may be omitted. For example, details of well-known matter and overlapped descriptions for substantially the same configuration may be omitted. This is for preventing the description below from being unnecessarily lengthy and for facilitating understanding of the person skilled in the art.

It is to be noted that the accompanying drawings and the following descriptions are provided by the inventor so that the person skilled in the art sufficiently understands the present disclosure, and are not intended to limit the scope of the subject matter in the Claims.

Embodiment 1

The following describes non-limiting Embodiment 1 with reference to FIGS. 1 to 11B.

Figure 1:
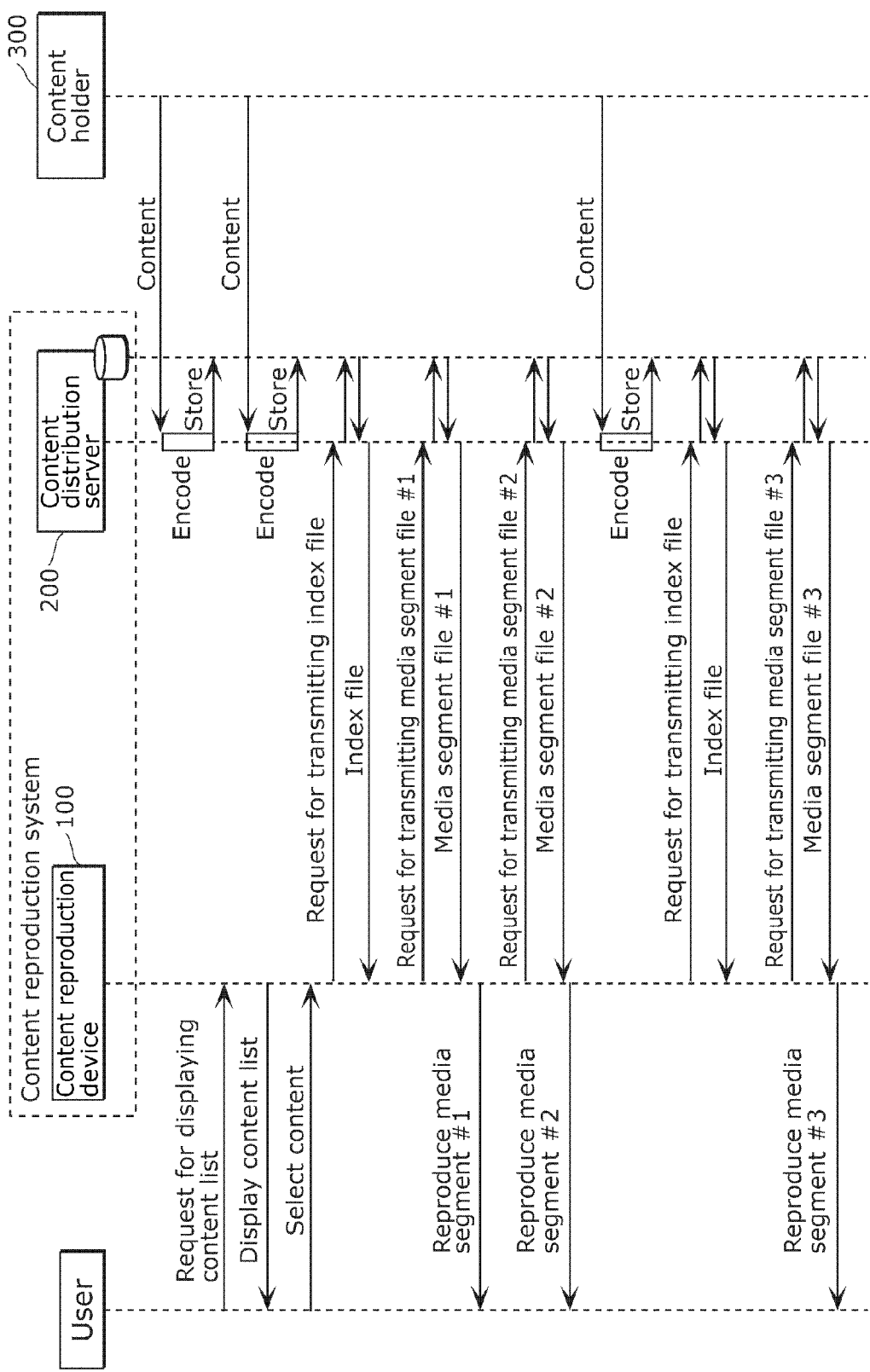
FIG. 1 is a diagram showing an outline of basic processing for reproducing content in a content reproduction system according to Embodiment 1.

First, with reference to FIG. 1, basic processing for reproducing content in a content reproduction system according to this embodiment is described. FIG. 1 is a diagram showing an outline of the basic processing for reproducing the content in the content reproduction system according to this embodiment.

First, as shown in FIG. 1, the content reproduction system according to this embodiment includes a content reproduction device 100 and a content distribution server 200. The content reproduction device 100 and the content distribution server 200 are each connected to a communication network, and are capable of communicate with each other. Although not particularly specified, an example of the communication network includes the Internet.

The content distribution server 200 receives content from a content holder (for example, a broadcasting station) 300. The content distribution server 200 then encodes the content received from the content holder 300 on a per segment basis which has a length of approximately several seconds to several tens of seconds, and stores the encoded content in a storing unit as media segment files. Moreover, the content distribution server 200 creates an index file which is a list of distributable media segment files and stores the created index file in the storing unit.

It is to be noted that the content distribution server 200 may receive the content from the content holder 300 through broadcasting waves or through the communication network. Moreover, although a type of content distributed by the content holder 300 is not particularly specified, a description is given assuming that the content is real-time content (live content) such as sport broadcasting.

The content reproduction device 100 displays, in response to a request from a user, a list of content that can be received from the content distribution server 200 (that is, reproducible content). The content reproduction device 100 then determines content by causing the user to select the content for viewing in the displayed list of content.

After the content for viewing is selected, the content reproduction device 100 transmits, to the content distribution server 200 through the communication network, a request for transmitting an index file and receives the index file of the content for viewing from the content distribution server 200 through the communication network.

Next, the content reproduction device 100 receives the media segment files listed in the received index file from the content distribution server 200, decodes the received media segment files, and displays the decoded media segment files on the display device. In the example shown in FIG. 1, the content reproduction device 100 transmits, to the content distribution server 200 through the communication network, a request for transmitting a media segment file #1, receives the media segment file #1 from the content distribution server 200 through the communication network, and then reproduces (displays on the display device) a media segment #1 which is obtained by decoding the media segment file #1.

Moreover, before the reproduction of the media segment #1 is finished, the content reproduction device 100 receives a media segment file #2 from the content distribution server 200 and decodes the received media segment file #2 in the same procedure as above.

At this time, the content distribution server 200 continues to receive the content from the content holder 300 in parallel with transmitting the index file and the media segment files in response to the request from the content reproduction device 100. The content distribution server 200 continues to create media segment files and add URLs of sources of the newly created media segment files to the index file (update the index file) until the reception of the content is finished.

Moreover, the content reproduction device 100 continues to receive the updated index file at a predetermined timing, and continues to receive and reproduce the newly created media segment files. With this, the content reproduction device 100 is capable of reproducing the real-time content.

Figure 2:
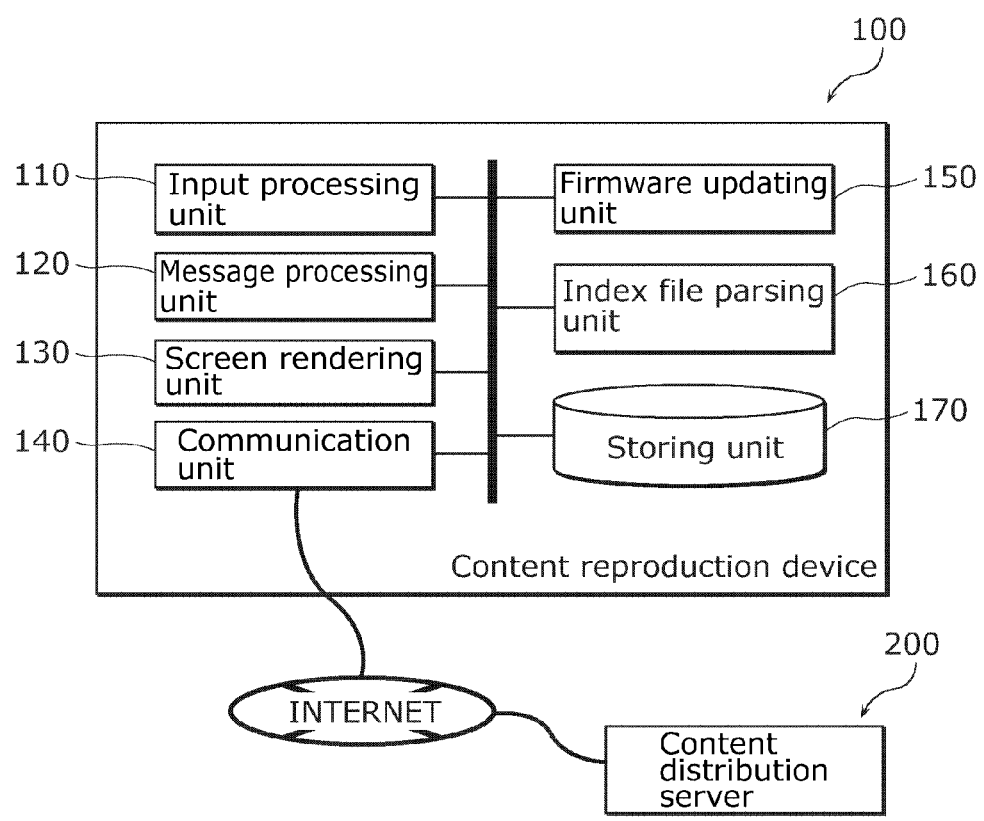
FIG. 2 is a block diagram showing a configuration of the content reproduction device according to Embodiment 1.

Next, the configuration of the content reproduction device 100 according to this embodiment is described with reference to FIG. 2. FIG. 2 is a block diagram showing the configuration of the content reproduction device 100 according to this embodiment.

As shown in FIG. 2, the content reproduction device 100 according to this embodiment includes an input processing unit 110, a message processing unit 120, a screen rendering unit 130, a communication unit 140, a firmware updating unit 150, an index file parsing unit 160, and a storing unit 170.

The input processing unit 110 is an input interface which receives an input of various information items including an instruction and a request from the user. An example of the input processing unit 110 is not particularly specified, and any input interface including, for example, a receiving unit for receiving a signal from a remote controller, a touch panel superimposed on a display device, a keyboard, and a mouse may be employed.

Specifically, the input processing unit 110 is capable of receiving a request for displaying a content list and a selection of the content for viewing from the user as shown in FIG. 1. Moreover, the input processing unit 110 is capable of receiving from the user a synchronization instruction (instruction for starting "Catch Up" processing and instruction for starting "Just" processing), an input of a specified reproduction position, an input of a message transmitted to another content reproduction device, and others. Details of these information items are described later.

The message processing unit 120 receives various information items from the content distribution server 200, an SNS server 400 described below, and others through the communication unit 140, and performs processing according to the received information. For example, upon receiving an index file from the content distribution server 200, the message processing unit 120 stores the received index file in the storing unit 170 and causes the index file parsing unit 160 to parse the index file. Moreover, upon receiving a media segment file from the content distribution server 200, the message processing unit 120 stores the received media segment file in the storing unit 170 and causes the screen rendering unit 130 to reproduce the media segment file. Furthermore, upon receiving a message from another content reproduction device through the SNS server 400, the message processing unit 120 provides the received message to the screen rendering unit 130 and causes the display device to display the message at predetermined timing. Details of the above processing are described later.

The screen rendering unit 130 displays an image (video) including a menu screen, content, and a message on the display device. It is to be noted that the content reproduction device 100 may include the display device, or may output the content to an external display device. Although not particularly specified, examples of the display device may include a liquid crystal display, a plasma display, and an organic electroluminescence display.

The content reproduction device 100 including the display device may be implemented as, for example, a television receiver, a tablet terminal, a smart phone, or a personal computer with a display. Moreover, the content reproduction device 100 which outputs the content to the external display device may be implemented as, for example, a set top box or a personal computer without a display.

The communication unit 140 is a communication interface connected to the communication network. A configuration of the communication unit 140 is not particularly specified, and any wired or wireless communication interface may be employed.

The firmware updating unit 150 obtains a new firmware from a server (not shown) on the communication network and updates a firmware used in the content reproduction device 100. Moreover, the firmware updating unit 150 may update not only the firmware but information necessary for displaying content on the display device (for example, constituent elements of a menu screen).

The index file parsing unit 160 parses the index file stored in the storing unit 170 and requests the content distribution server 200 to transmit a desired media segment file. Details of the index file are described later.

In the storing unit 170, the index file, the media segment files, and various information items necessary for operations of the content reproduction device 100 are stored. A configuration of the storing unit 170 is not particularly specified, and any means for storing data may be employed, such as a dynamic random access memory (DRAM), a synchronous dynamic random access memory (SDRAM), a flash memory, a ferroelectric memory, and a hard disk drive (HDD).

It is to be noted that, in the reproduction of content in the content reproduction device 100 configured as above, when the reproduction of the content is temporarily stopped by the user or interrupted due to a shortage of bandwidth or a trouble in the communication network, there may be a case where a reproduction position (a part currently displayed on the display device that is currently reproducing the content) in the content reproduction device 100 and a distributable position indicating a position of a latest distributable segment in the content distribution server 200 do not match (the reproduction position is behind the distributable position).

In view of this, the content reproduction device 100 configured as above includes: an obtaining unit configured to obtain the content including plural segments on a per segment basis from a server through a communication network, each of the segments being assigned with a priority; and a reproduction controlling unit configured to reproduce the content on the per segment basis by displaying the content obtained by the obtaining unit on a display device on the per segment basis. In this regard, the reproduction controlling unit is configured to control reproduction of a target segment based on an amount of delay and a priority of the target segment, the amount of delay being a difference between a distributable position indicating a position of a latest segment distributable by the server and a first reproduction position in the content that is currently reproduced. It is to be noted that the message processing unit 120 and the communication unit 140 in FIG. 2 correspond to, for example, the obtaining unit. Moreover, the screen rendering unit 130 and the index file parsing unit 160 in FIG. 2 correspond to, for example, the reproduction controlling unit.

Next, the configuration of the content distribution server 200 according to this embodiment is described with reference to FIG. 3. FIG. 3 is a block diagram showing the configuration of the content distribution server 200 according to this embodiment.

In the example shown in FIG. 3, plural content reproduction devices 100A, 100B, and 100C are connected to the content distribution server 200 through the communication network. Accordingly, the content distribution server 200 is connected to the content reproduction devices 100A, 100B, and 100C, and is capable of distributing content to each of the content reproduction devices 100A, 100B, and 100C. It is to be noted that the configuration of the content reproduction devices 100A, 100B, and 100C in FIG. 3 is in common with that of the content reproduction device 100 described with reference to FIG. 2.

As shown in FIG. 3, the content distribution server 200 according to this embodiment includes a load balancer 290 and plural (three in the example shown in FIG. 3) server devices 200A, 200B, and 200C. Moreover, the server device 200A includes a message transmitting unit 210, a controlling unit 220, a communication unit 230, a monitoring unit 240, a terminal information DB 250, and a storing unit 260. It is to be noted that since the server devices 200A, 200B, and 200C have equivalent configurations, the following describes the server device 200A in detail.

The message transmitting unit 210 transmits various information items to the content reproduction devices 100A, 100B, and 100C through the communication network. For example, upon receiving a request for transmitting an index file, the message transmitting unit 210 transmits the index file of the content indicated in the request to the content reproduction devices 100A, 100B, and 100C through the communication network. Moreover, upon receiving a request for transmitting a media segment file, the message transmitting unit 210 transmits the media segment file indicated in the request to the content reproduction devices 100A, 100B, and 100C through the communication network. Furthermore, the message transmitting unit 210 transmits the firmware, the screen constituent elements, etc. to the content reproduction devices 100A, 100B, and 100C through the communication network at predetermined timing.

The controlling unit 220 controls the server device 200A overall. For example, the controlling unit 220 controls operations of other function blocks in response to requests received from the content reproduction devices 100A, 100B, and 100C. Moreover, the controlling unit 220 encodes the content received from the content holder 300 on a per segment basis, stores the encoded content in the storing unit 260, creates an index file, and stores the index file in the storing unit 260.

The communication unit 230 is a communication interface connected to the communication network. A configuration of the communication unit 230 is not particularly specified, and any wired or wireless communication interface may be employed.

The monitoring unit 240 determines timing to transmit information (for example, information about the firmware and the configuration of the screen) to each of the content reproduction devices 100A, 100B, and 100C, according to the state of each of the content reproduction devices 100A, 100B, and 100C connected to the content distribution server 200 through the communication network and information about each of the content reproduction devices 100A, 100B, and 100C held in the terminal information DB 250.

The terminal information DB 250 holds various items of information about the content reproduction devices 100A, 100B, and 100C. For example, the terminal information DB 250 holds information about the version of the firmware used by each of the content reproduction devices 100A, 100B, and 100C, identifiers of the screen constituent elements, whether nor not each of the above information items requires updating, and others.

In the storing unit 260, the index file, the media segment files, and various information items necessary for operations of the content distribution server 200 are stored. It is to be noted that although the terminal information DB 250 and the storing unit 260 are separately provided in FIG. 3, the terminal information DB 250 may be stored in the storing unit 260. A configuration of the storing unit 260 is not particularly specified, and any storing means can be employed in the same manner as the storing unit 170 shown in FIG. 2.

The load balancer 290 is accessed by the content reproduction devices 100A, 100B, and 100C, and assigns processing to each of the server devices 200A, 200B, and 200C so as to level loads of the server devices 200A, 200B, and 200C.

Next, with reference to FIGS. 4A and 4B, an example of the information held in the index file is described. FIG. 4A is a list of source URLs of index files on a bit rate basis in content distribution. FIG. 4B illustrates an example of the information held in the index file.

First, the content distribution server 200 encodes the content obtained from the content holder 300 on a distribution bit rate basis and creates index files on the distribution bit rate basis. FIG. 4A shows that the content distribution server 200 holds an index file "http://example.com/low.m3u8" which is to be used when the distribution bit rate is more than or equal to 1.28 Mbps, an index file "http://example.com/mid.m3u8" which is to be used when the distribution bit rate is more than or equal to 2.56 Mbps, an index file "http://example.com/hi.m3u8" which is to be used when the distribution bit rate is more than or equal to 7.68 Mbps, and an index file "http://example.com/audio-only.m3u8" which is to be used when the distribution bit rate is more than or equal to 65 Kbps.

Subsequently, the content reproduction device 100 may first obtain the list shown in FIG. 4A, select an index file according to image quality desired by the user, a processing speed of the content reproduction device 100, a bandwidth of the connected communication network, etc., and obtain the selected index file from the content distribution server 200.

The index file (an index file in the list shown in FIG. 4A) obtained from the content distribution server 200 holds, for example, details as shown in FIG. 4B.

First, "#EXT-X-TARGETDURATION:8" in the second line in FIG. 4B indicates that each of media segment files listed in this index file has a reproduction time period of less than or equal to eight seconds. Moreover, "#EXT-X-MEDIA-SEQUENCE:2680" in the third line indicates that the media segment file listed at the top of this index file has a sequence number (the number indicating the order of reproducing the media segment files) of 2680.

"#EXTINF-PRIORITY:0" in the fifth line indicates that the priority of media segment files after "#EXTINF-PRIORITY:0" (to the next "#EXTINF-PRIORITY:x") is "0". In FIG. 4B, the priority of two media segment files 41 and 42 is "0". Moreover, a line immediately above the source URL of each segment file (for example, "#EXTINF:8") indicates that the segment file immediately under the source URL has a reproduction time period of eight seconds.

That is, in the index file shown in FIG. 4B, information items (source URLs) which indicate two media segment files 41 and 42 having a priority of "0", four media segment files 43, 44, 45, and 46 having a priority of "100", two media segment files 47 and 48 having a priority of "0", are listed in the stated order. As described above, in the index file, a range of the segments that are distributable by the content distribution server 200 is listed (that is, information indicating distributable media segment files).

Moreover, a priority is assigned to each media segment file. The priority is appropriately set by the content distribution server 200. For example, a higher priority may be assigned to a commercial message part, or to an exciting part in content such as a goal scene in a soccer game.

It is to be noted that although the priority is assigned to the media segment file by the content distribution server 200 which creates the index file and the media segment file in this embodiment, a method of assigning the priority is not limited to the above-described method. For example, a server (not shown) connected between the content reproduction device 100 and the content distribution server 200 may add a priority to an index file obtained from the content distribution server 200 to create an index file, and distribute the created index file including the priority directed to a specific content reproduction device 100.

Figure 5A:
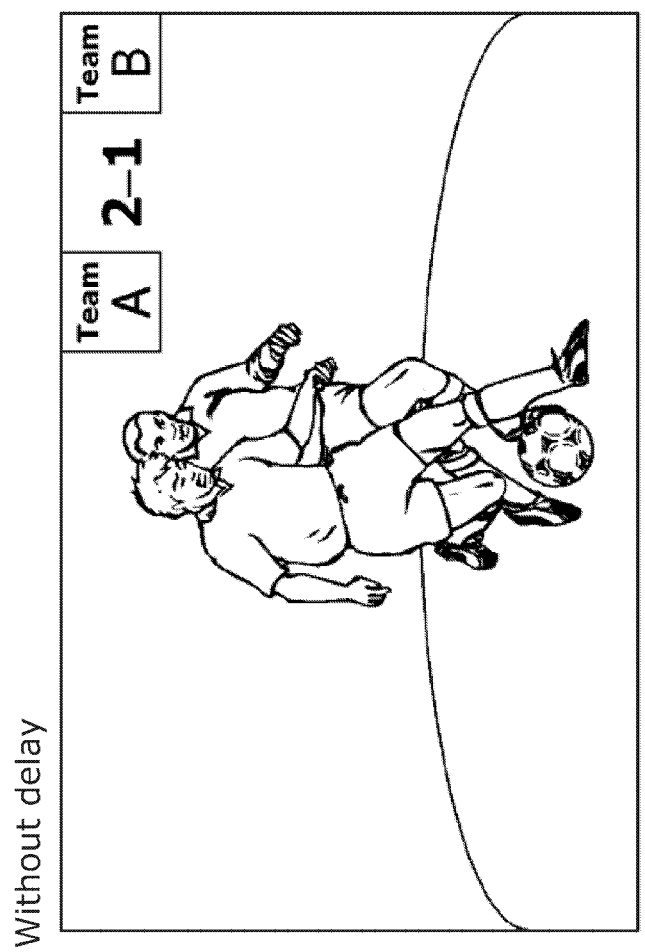
FIG. 5A is a diagram showing a display example of content reproduced in the content reproduction device without delay.
Figure 5B:
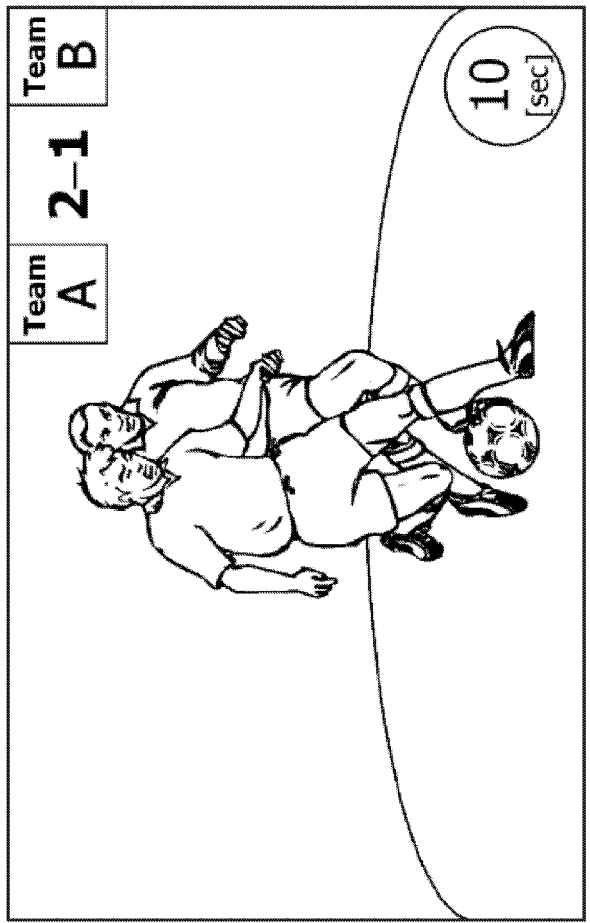
FIG. 5B is a diagram showing an exemplary screen with information indicating an amount of delay.
Figure 5D:
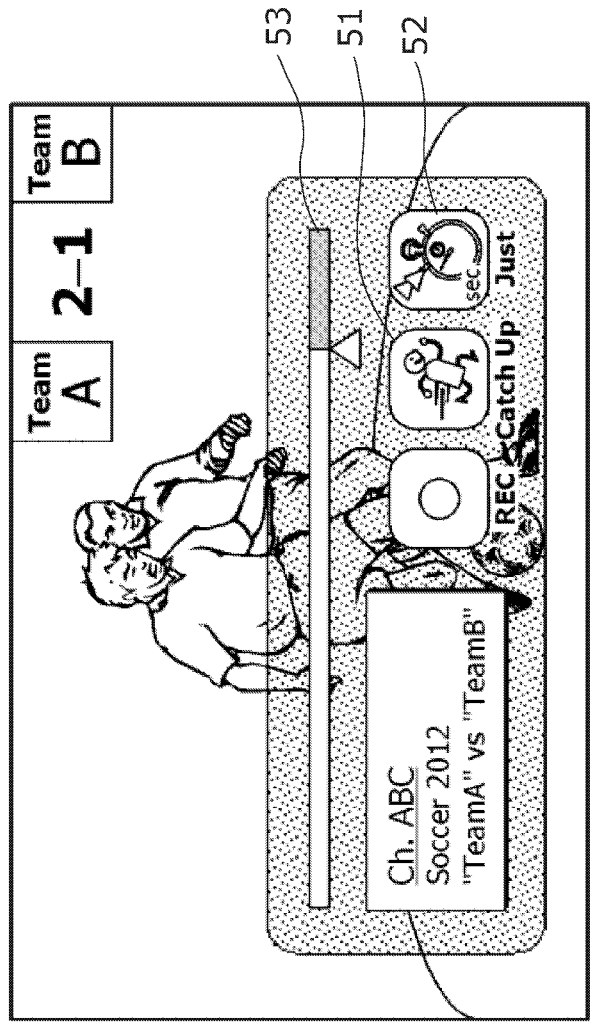
FIG. 5D is a diagram showing another exemplary screen for prompting an operation to resolve the delay.

The following describes a display example of the content in the content reproduction device 100 with reference to FIGS. 5A to 5D. Each of FIGS. 5A to 5D is a diagram showing a display example of the content reproduced by the content reproduction device 100. FIG. 5A is a diagram showing a display example of the content that is reproduced by the content reproduction device 100 without delay. FIG. 5B is a diagram showing an exemplary screen with information indicating an amount of delay. FIG. 5C is a diagram showing an exemplary screen for prompting an operation to resolve the delay. FIG. 5D is a diagram showing another exemplary screen for prompting an operation to resolve the delay.

It is to be noted that "delay" in this embodiment means that the reproduction position in the content reproduction device 100 is behind the distributable position in the content distribution server 200. Moreover, "amount of delay" in this embodiment means the amount of delay of the reproduction position with respect to the distributable position.

First, when the reproduction of the content is not delayed, the content reproduction device 100 reproduces a media segment file that includes the current reproduction position as shown in FIG. 5A. Next, when the reproduction of the content is slightly delayed (when the amount of delay exceeds a first threshold value), the content reproduction device 100 displays the amount of delay on the display device as shown in FIG. 5B. In the example shown in FIG. 5B, "10 [sec]" is displayed in the lower right portion of the display screen.

Next, when the reproduction of the content is further delayed (when the amount of delay exceeds a second threshold value which is larger than the first threshold value), the content reproduction device 100 prompts the user to input a synchronization instruction through the display device as shown in FIGS. 5C and 5D. It is to be noted that the "synchronization instruction" in this embodiment is an instruction for starting processing ("Catch Up" processing or "Just" processing) for synchronizing the reproduction position with the distributable position.

In the example shown in FIG. 5C, a "Catch Up" processing button 51 and a "Just" processing button 52 are displayed in the lower portion of the display screen. The "Catch Up" processing gradually brings the reproduction position close to the distributable position. On the other hand, "Just" processing causes the reproduction position to match with the distributable position at once. Details of the above processing are described later.

In the example of FIG. 5D, in addition to the "Catch Up" processing button 51 and the "Just" processing button 52, a seek bar 53 which indicates the amount of delay of the reproduction position is displayed in the lower portion of the display screen. The total length of the seek bar 53 indicates the range of a segment which can be obtained from the content distribution server 200. More specifically, the left end of the seek bar 53 indicates the start position of the first segment that can be obtained from the content distribution server 200. Moreover, the right end of the seek bar 53 indicates the start position of the last segment that can be obtained from the content distribution server 200. Moreover, a Δ sign under the seek bar 53 indicates a current reproduction position. That is, the distance from the position of the Δ sign to the right end of the seek bar 53 corresponds to the amount of delay.

In the cases shown in FIGS. 5C and 5D, when the "Catch Up" processing button 51 or the "Just" processing button 52 is pressed by the user (when the synchronization instruction is received by the input processing unit 110), the content reproduction device 100 starts synchronizing the reproduction position with the distributable position. Details of the processing are described later.

Moreover, although not shown, when the reproduction of the content is further delayed (when the amount of delay exceeds a third threshold value which is larger than the second threshold value), the content reproduction device 100 may automatically synchronize the reproduction position with the distributable position without waiting for an input of the synchronization instruction from the user.

Figure 6:
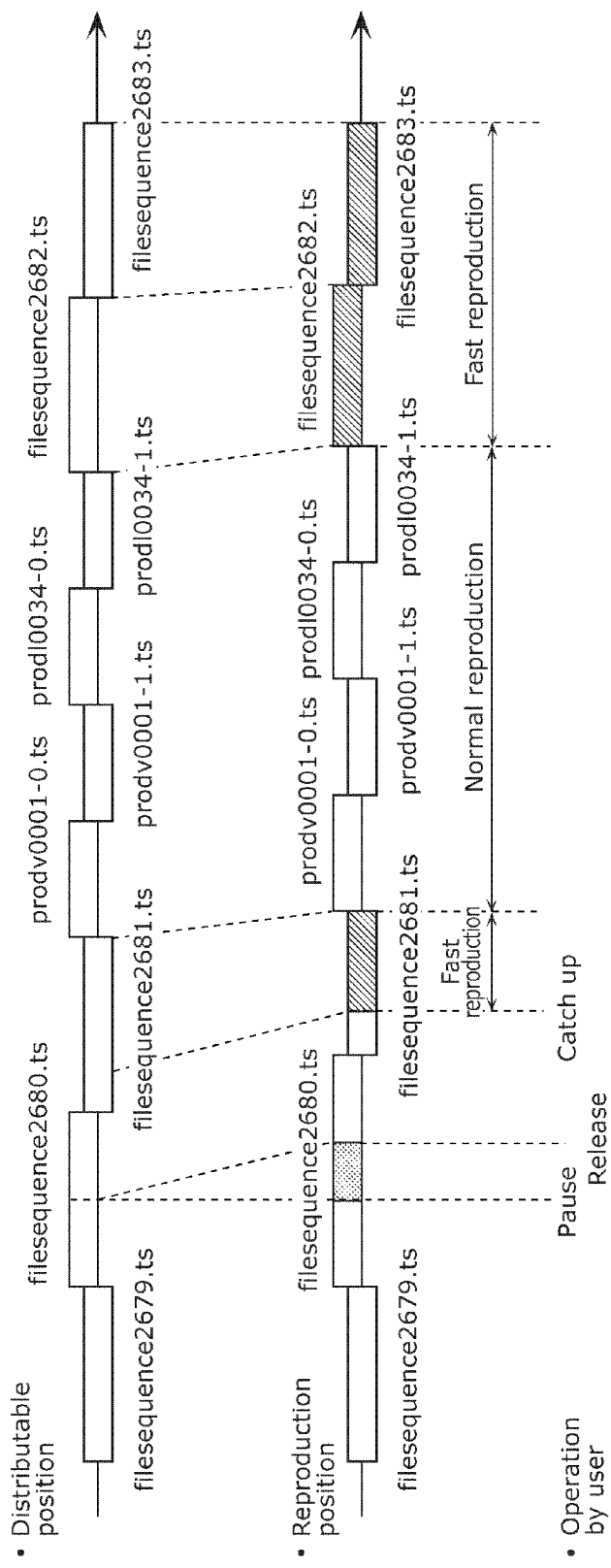
FIG. 6 is a diagram showing a relationship between a distributable position and a reproduction position before and after "Catch Up" processing.
Figure 7:
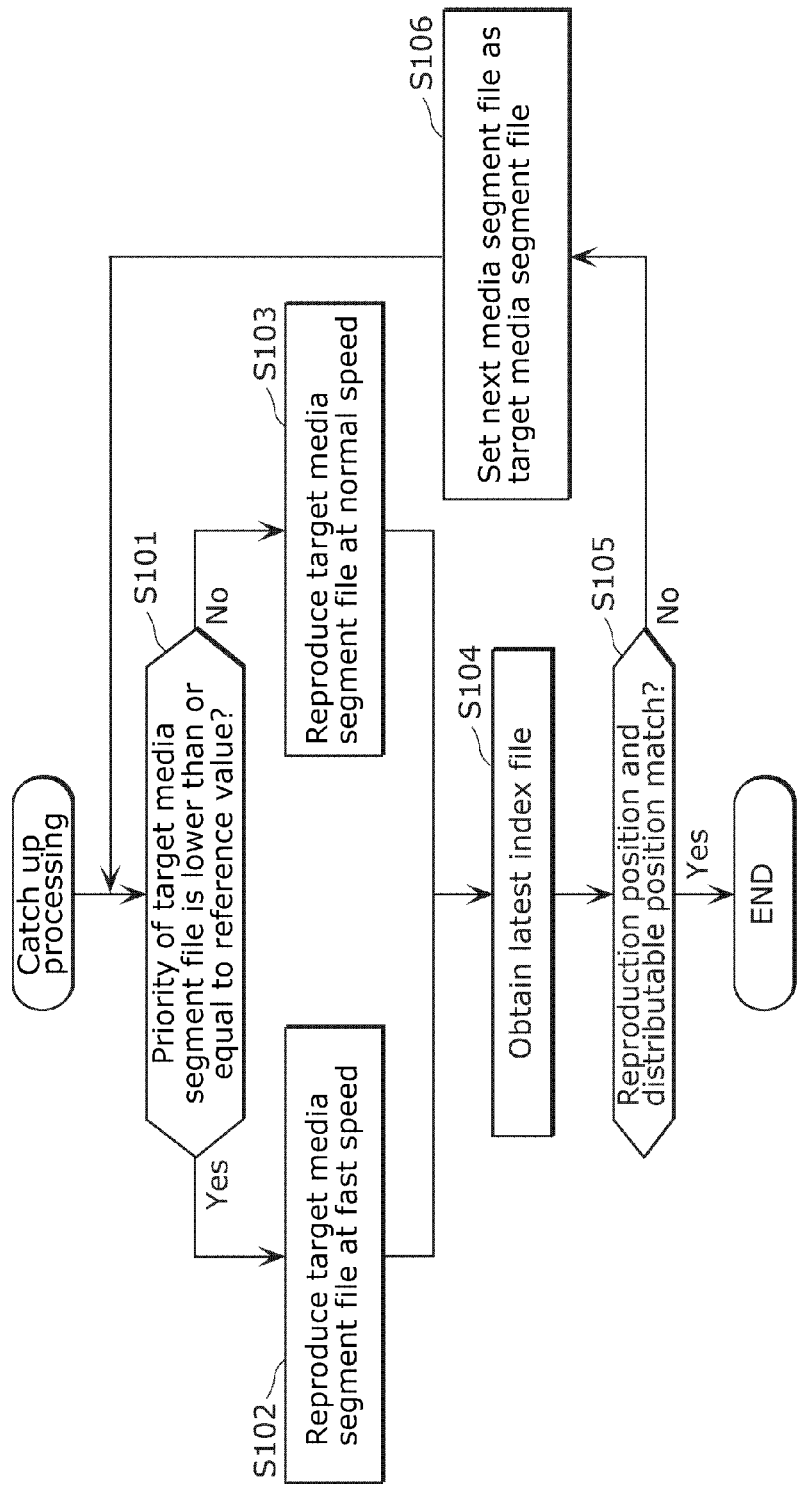
FIG. 7 is a flowchart showing a procedure of the "Catch Up" processing.

Next, the "Catch Up" processing is described with reference to FIGS. 6 and 7. FIG. 6 is a diagram showing a relationship between the distributable position and the reproduction position before and after the "Catch Up" processing. FIG. 7 is a flowchart showing a procedure of the "Catch Up" processing.

First, as shown in FIG. 6, it is assumed that the user temporarily stops the reproduction of the content ("Pause" in FIG. 6) during a media segment file "filesequence2680.ts" is reproduced in the content reproduction device 100, and then the content reproduction device 100 releases the pause ("Release" in FIG. 6). As a result, the reproduction position does not move forward during a period indicated by the dot hatching in FIG. 6, so that the reproduction position at the time of the release of the pause is behind the distributable position. It is assumed that the reproduction position and the distributable position are matched with each other until the time when the reproduction is temporarily stopped.

It is to be noted that although the following example describes the case where the reproduction position of the content is behind the distributable position because the user temporarily stops the reproduction of the content, the cause of the delay in the reproduction of the content is not limited to this. For example, the delay may be caused by a delay or a trouble in the communication network, or may be caused by an operation by the user to move the reproduction position of the content backward (an operation on the seek bar 53 described later).

Next, it is assumed that the user presses the "Catch Up" processing button 51 shown in FIG. 5C ("Catch Up" in FIG. 6), during a media segment file "filesequence2680.ts" is reproduced in the content reproduction device 100. As a result, the content reproduction device 100 performs the "Catch Up" processing shown in FIG. 7.

First, the content reproduction device 100 determines whether or not the priority of the currently reproduced media segment file (target media segment file) is lower than or equal to a reference value (S101). With reference to the index file shown in FIG. 4B, the priority of the media segment file "filesequence2681.ts" is "0".

Here, given that the reference value of the priority is "50", at the time when the "Catch Up" processing button 51 is pressed in FIG. 6, the content reproduction device 100 determines that the priority of the target media segment file is lower than or equal to the reference value (Yes in S101). In this case, the content reproduction device 100 reproduces the remaining part of the target media segment file at fast speed (S102). That is, the content reproduction device 100 reproduces the target media segment file at a second reproduction speed which is faster than a first reproduction speed of normal reproduction.

Next, the content reproduction device 100 obtains an updated index file from the content distribution server 200 (S104). In is to be noted that the index file is not necessarily obtained at this timing, but may be obtained asynchronously with the "Catch Up" processing.

Next, the content reproduction device 100 determines whether or not the reproduction position and the distributable position match at the time when the reproduction of the target media segment file is finished (S105). In the example shown in FIG. 6, since the reproduction position is behind the distributable position at the time when the reproduction of the media segment file "filesequence2681.ts" is finished (No in S105), the content reproduction device 100 sets the next media segment file "prodv0001-0.ts" listed in the index file as the target segment file (S106), and then the process returns to Step S101.

In the example shown in FIG. 4B, since the priority of the media segment file "prodv0001-0.ts" is "100", the content reproduction device 100 determines that the priority of the target media segment file is higher than the reference value (No in S101) and reproduces this target media segment file at normal speed (S103).

After repeating the above processing for the subsequent media segment files, the content reproduction device 100 reproduces media segment files "prodv0001-1.ts", "prodl0034-0.ts", and "prodl0034-1.ts" at normal speed, and reproduces media segment files "fileSequence2682.ts" and "fileSequence2683.ts" at fast speed as shown in FIG. 6. In the example shown in FIG. 6, since the reproduction position is matched with the distributable position as a result of reproducing media segment files "fileSequence2682.ts" and "fileSequence2683.ts" at fast speed, the content reproduction device 100 finishes the "Catch Up" processing.

In the above "Catch Up" processing, a segment having a priority higher than the reference value is reproduced at normal speed, and a segment having a priority lower than or equal to the reference value is reproduced at high speed. With this, the content distribution server 200 is capable of synchronizing the reproduction position and the distributable position without reproducing at high speed a segment which the content distribution server 200 wants the user to view (segment having a high priority). Moreover, since the reproduction position is gradually brought close to the distributable position, the reproduction of a segment having a low priority is not completely skipped.

Here, the speed of the high speed reproduction in Step S102 is, for example, in a range in which audio reproduction is possible (for example, approximately 1.2 to 1.5 times as fast as the normal reproduction). Moreover, the speed of the high speed reproduction is not necessarily constant, but may be set on a per segment basis according to the priority. Specifically, it may be that the reproduction speed is higher in a segment having a lower priority and the reproduction speed is lower in a segment having a higher priority.

Figure 8:
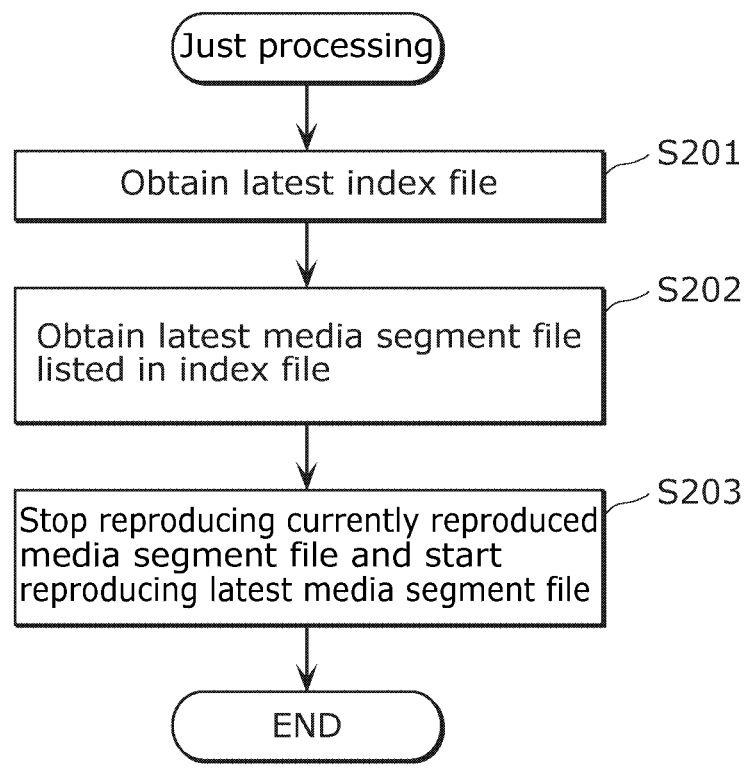
FIG. 8 is a flowchart showing a procedure of "Just" processing.

Next, the "Just" processing is described with reference to FIG. 8. FIG. 8 is a flowchart showing a procedure of the "Just" processing. It is to be noted that the "Just" processing according to this embodiment skips the reproduction of segments between a segment including the reproduction position and a latest segment indicated by the distributable position.

Specifically, the content reproduction device 100 obtains a latest index file from the content distribution server 200 through the communication network (S201). Next, the content reproduction device 100 obtains a latest media segment file listed in the index file obtained in Step S201 from the content distribution server 200 through the communication network (S202). The content reproduction device 100 then stops reproducing the currently reproduced media segment file and starts reproducing the latest media segment file obtained in Step S202 (S203).

A specific example of the "Just" processing is described with reference to the index file shown in FIG. 4B. It is to be noted that although the media segment file listed in the end of the index file is the latest media segment file in the description of the specific example below, the position of the latest media segment file is not limited to this; a media segment file listed at a predetermined position (for example, a third item from the bottom) in the index file may be the latest media segment file.

As the first example, when the "Just" processing button 52 is pressed during reproduction of a media segment file 47 and a latest media segment file 48 is obtained in Step S202, the content reproduction device 100 skips the reproduction of the media segment file 47 for a part after the "Just" processing button 52 is pressed and starts reproducing the media segment file 48.

On the other hand, as the second example, when the "Just" processing button 52 is pressed during reproduction of a media segment file 42 and a latest media segment file 48 is obtained in Step S202, the content reproduction device 100 may be configured not to skip media segment files 43 to 46 having a priority higher than the reference value.

That is, the content reproduction device 100 skips the reproduction of the media segment file 42 for a part after the "Just" processing button 52 is pressed and reproduces the media segment files 43 to 46 at a normal speed. At the time when the reproduction of the media segment file 46 is finished, the content reproduction device 100 may obtain a new index file and reproduce a latest media segment file listed in the index file.

Since it is possible to synchronize the reproduction position and the distributable position at once in the above "Just" processing, it is effective when, for example, the reproduction position is significantly behind the distributable position. Moreover, in the above second example of the "Just" processing, it is possible to effectively prevent the segment which the content distribution server 200 wants the user to view from being skipped.

Figure 9B:
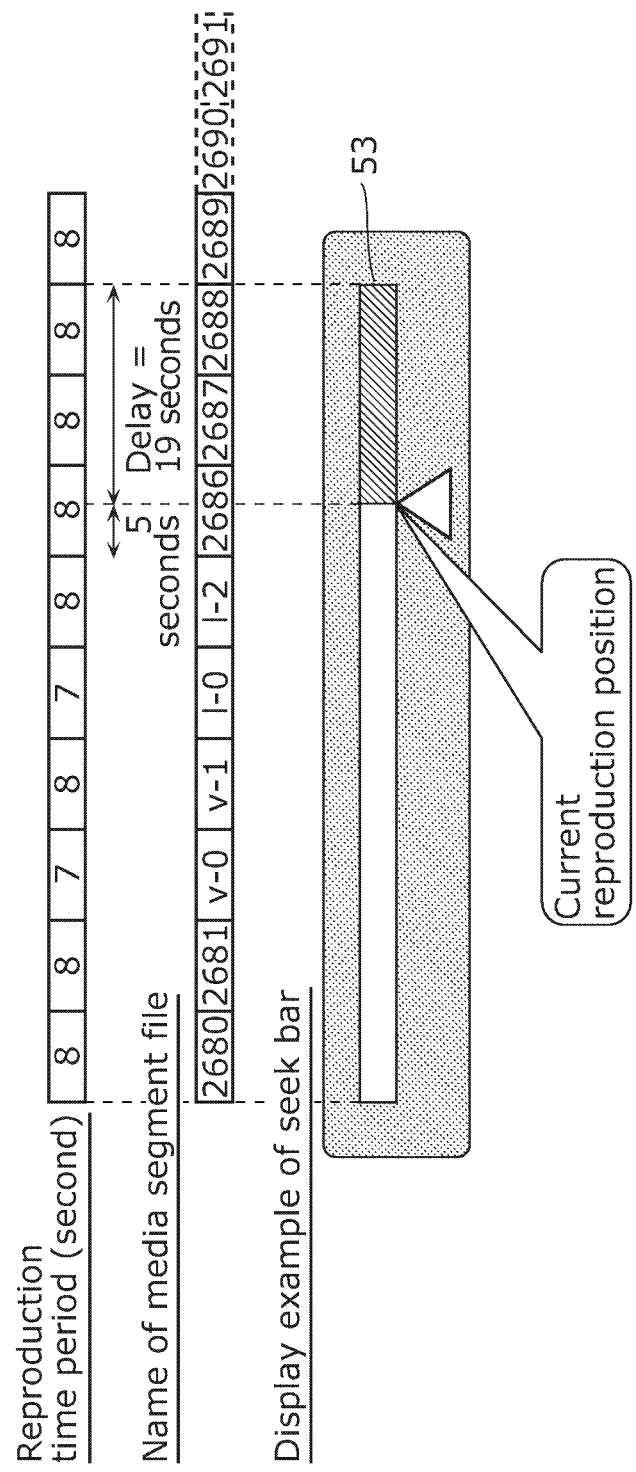
FIG. 9B is a display example of a seek bar in the case where reproduction is temporarily stopped in the middle of a media segment file at the first time.
Figure 10B:
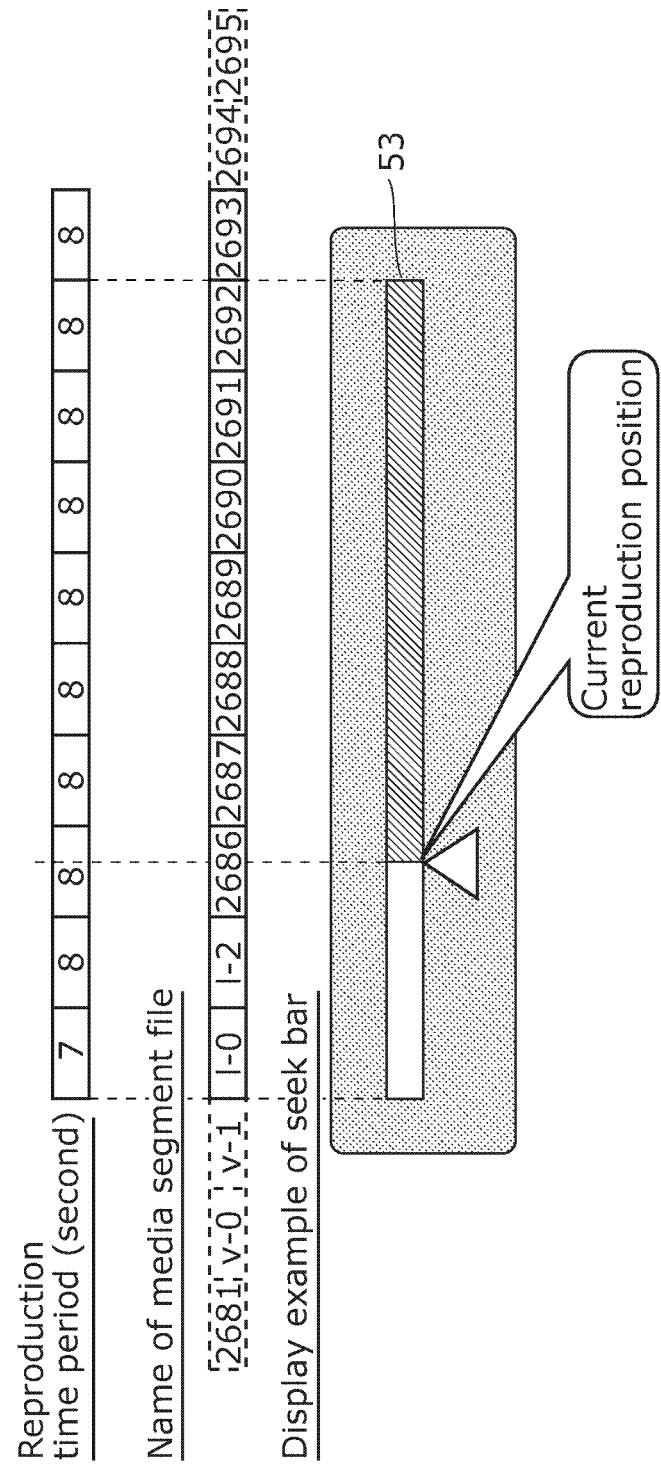
FIG. 10B is a display example of the seek bar in the case where reproduction is temporarily stopped in the middle of the media segment file at the second time.
Figure 11B:
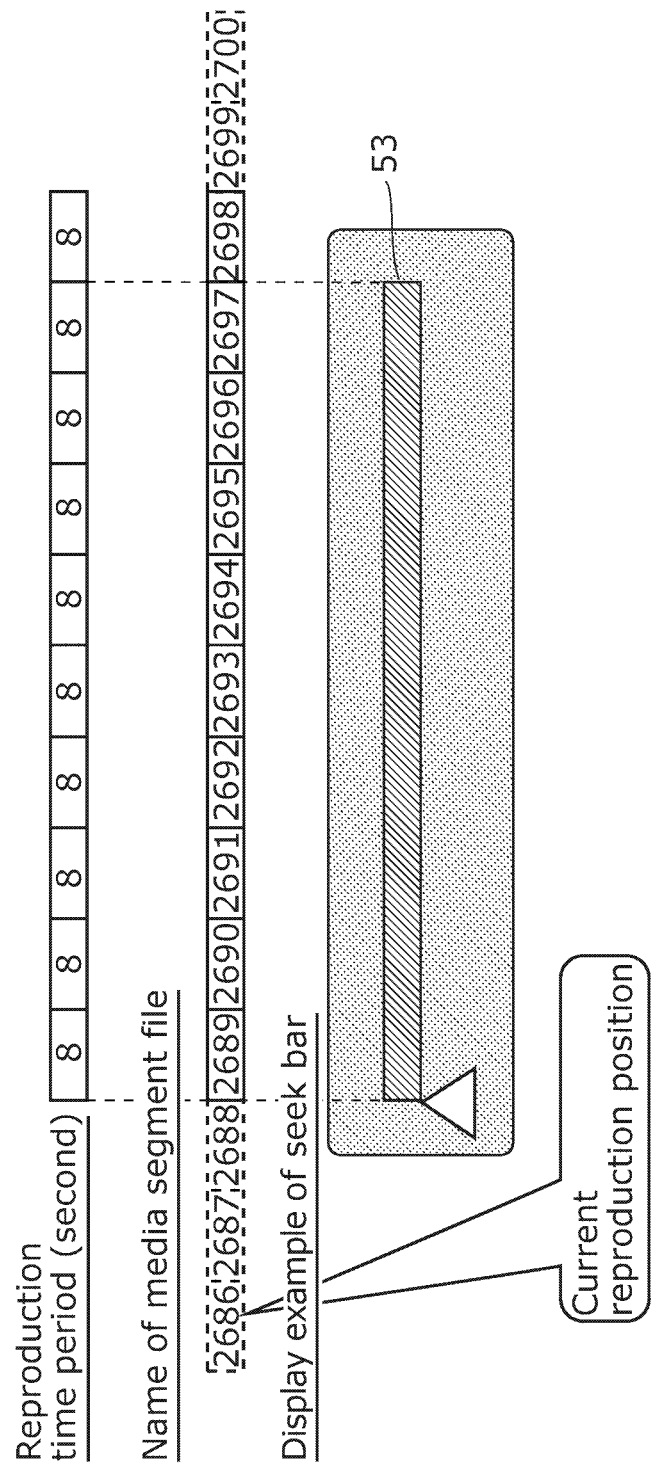
FIG. 11B is a display example of the seek bar in the case where reproduction is temporarily stopped in the middle of the media segment file at the third time.

The following describes details of the seek bar 53 with reference to FIGS. 9A to 11B. FIGS. 9A, 10A, and 11A are diagrams showing examples of index files at different time. FIGS. 9B, 10B, and 11B are diagrams showing display examples of the seek bar 53 when the reproduction is temporarily stopped in the middle of a media segment file 67 at different time.

First, in the index file shown in FIG. 9A, media segment files 61 to 70 are listed. That is, in the seek bar 53 at this time as shown in FIG. 9B, the left end indicates the start position of the media segment file 61 having a sequence number of 2680 and the right end indicates the end position of the media segment file 69 having a sequence number of 2688. The Δ sign indicating a current reproduction position points to a position in the middle (position where 5 seconds has passed) of the media segment file 67 having a sequence number of 2686. That is, looking at the seek bar 53 shown in FIG. 9B, the user can know an amount of delay (19 seconds in this example) from the length of the hatched region on the right of the Δ sign.

Next, the index file shown in FIG. 10A indicates the state approximately 20 seconds after the state shown in FIG. 9A, and media segment files 65 to 74 are listed therein. That is, in the seek bar 53 at this time as shown in FIG. 10B, the left end indicates the start position of the media segment file 65 of prod10034-0.ts and the right end indicates the end position of the media segment file 73 having a sequence number of 2692.

Moreover, given that the reproduction position is not changed from the state shown in FIG. 9B, it can be seen that the Δ sign shown in FIG. 10B is moved leftward compared to that in the FIG. 9B because the Δ sign still points to the position in the middle of the media segment file 67 having a sequence number of 2686. That is, when the reproduction of the content is stopped, the Δ sign in the seek bar 53 moves leftward over time and the region (hatched region) indicating the amount of delay in the seek bar 53 lengthens. With this, the user can intuitively understand that the amount of delay is gradually increasing.

Furthermore, the index file shown in FIG. 11A indicates the state approximately 40 seconds after the state shown in FIG. 10A, and media segment files 70 to 79 are listed therein. That is, in the seek bar 53 at this time as shown in FIG. 11B, the left end indicates the start position of the media segment file 70 having a sequence number of 2689 and the right end indicates the end position of the media segment file 78 having a sequence number of 2697.

Moreover, given that the reproduction position is not changed from the state shown in FIG. 9B, the media segment file 67 having a sequence number of 2686 is already deleted from the index file. Therefore, an actual reproduction position is positioned further left of the left end of the seek bar 53 as shown in FIG. 11B.

In this regard, the content reproduction device 100 may automatically start synchronizing the reproduction position and the distributable position at a time when the Δ sign indicating the reproduction position arrives at the left end (the oldest position in a distributable range) of the seek bar 53 or at a time when predetermined time has passed from the time when the Δ sign arrived at the left end.

Moreover, the seek bar 53 may be used not only for informing the user of the amount of delay, but for prompting the user to specify an arbitrary reproduction position (specified reproduction position). That is, as a result of causing the user to specify the arbitrary reproduction position (receiving an input of the specified reproduction position) on the seek bar 53, the content reproduction device 100 may temporarily stop the reproduction after the current reproduction position and start the reproduction from the specified reproduction position. With this, the user can review a missed scene and others.

As described above, with the content reproduction device 100 according to this embodiment, when real-time content distributed through the communication network is viewed, the reproduction position and the distributable position can be synchronized without skipping a part of the content which is regarded to be important by a distributer.

Embodiment 2

The following describes non-limiting Embodiment 2 with reference to FIGS. 12 to 15.

It is to be noted that detailed descriptions shared with Embodiment 1 are omitted and differences from Embodiment 1 are mainly described. Since basic configurations and operations of a content reproduction device 100 and a content distribution server 200 according to this embodiment are the same as those in Embodiment 1, the descriptions are not repeated.

In Embodiment 1, processing for synchronizing the reproduction position in the content reproduction device 100 with the distributable position in the content distribution server 200 is described. In Embodiment 2, for example, processing for transmitting/receiving a message between content reproduction devices 100A and 100B when the same content is reproduced in the content reproduction devices 100A and 100B, and processing for synchronizing the reproduction positions among the content reproduction devices 100A, 100B, and 100C are described.

Figure 12:
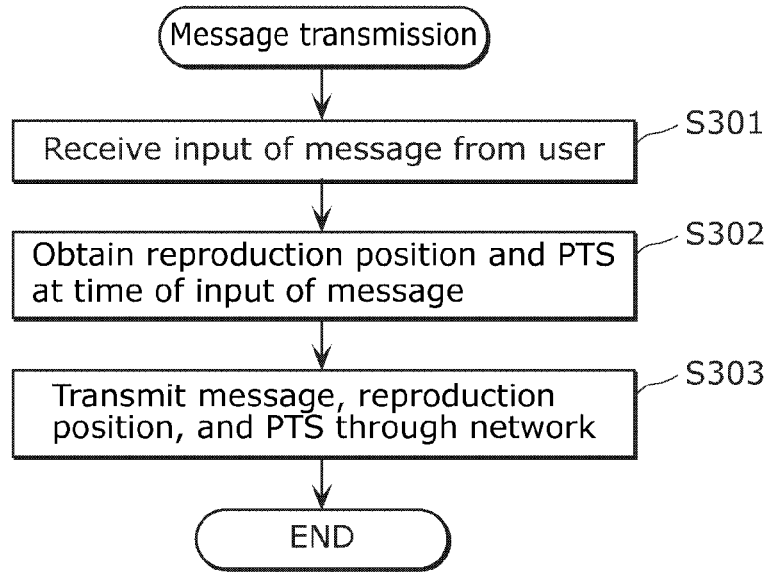
FIG. 12 is a flowchart showing processing for transmitting a message.
Figure 13:
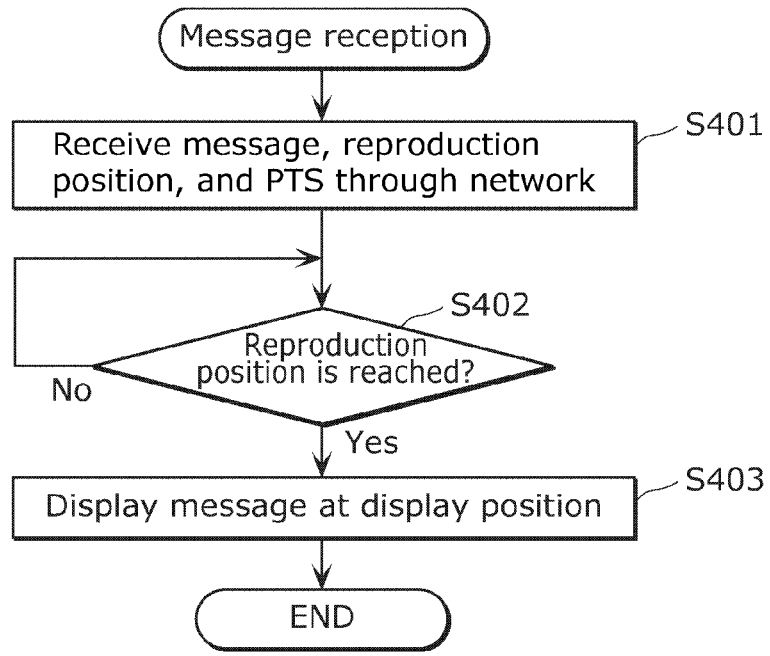
FIG. 13 is a flowchart showing processing for receiving the message.
Figure 14:
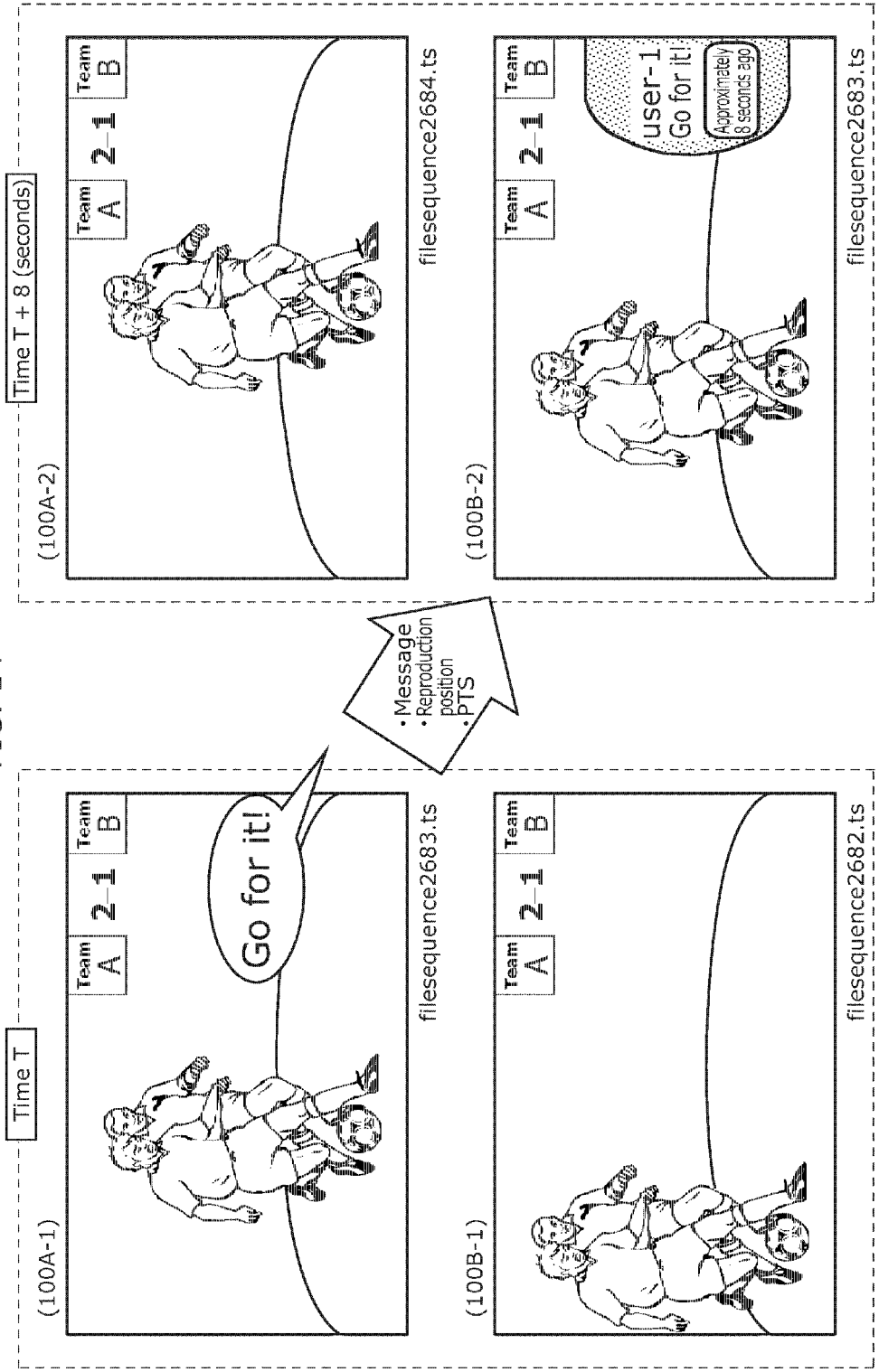
FIG. 14 is a diagram showing display examples in the content reproduction device which transmits/receives the message.

FIG. 12 is a flowchart showing processing for transmitting a message to another content reproduction device. FIG. 13 is a flowchart showing processing for receiving the message from another content reproduction device. FIG. 14 is a diagram showing display examples in two content reproduction devices which transmit/receive the message. It is to be noted that the following describes the case where the message is transmitted from the content reproduction device 100A to the content reproduction device 100B shown in FIG. 3.

For example, the content reproduction devices 100A and 100B reproduce the same content according to the index file shown in FIG. 9A. It is to be noted that, as shown in FIG. 14, a media segment file "fileSequence2683.ts" is displayed on a display screen of the content reproduction device 100A at time T as in a display example (100A-1). On the other hand, a media segment file "fileSequence2682.ts" is displayed on a display screen of the content reproduction device 100B at the time T as in a display example (100B-1). That is, the reproduction position in the content reproduction device 100B at the time T is behind the reproduction position in the content reproduction device 100A at the time T.

Here, it is assumed that, the content reproduction device 100A receives from a user (user-1) an input of a message "Go for it!" that is to be transmitted to the content reproduction device 100B at this timing (time T) (S301 in FIG. 12). At this time, the content reproduction device 100A obtains a reproduction position and a presentation time stamp (PTS) at the time of receiving the message (S302). The content reproduction device 100A then transmits the message received in Step S301, and the reproduction position and the PTS obtained in Step S302 to the content reproduction device 100B through a communication network (S303).

It is to be noted that although a method of determining the reproduction position is not particularly specified, the reproduction position may be derived from, for example, a combination of information indicating a media segment file including the reproduction position (a source URL, a sequence number, etc.) and a reproduction time period from the top of the media segment file to the reproduction position. Moreover, for example, a value obtained by parsing a currently reproduced TS file may be used as the PTS.

Next, the content reproduction device 100B receives the message, the reproduction position, and the PTS from the content reproduction device 100A through the communication network as shown in FIG. 13 (S401). In is to be noted that, in fact, the information items in Step S401 arrive at the content reproduction device 100B via an SNS server 400 from the content reproduction device 100A shown in FIG. 3.

Next, the content reproduction device 100B monitors the arrival of the reproduction position obtained in Step S401 (S402). In other words, the content reproduction device 100B monitors that a current reproduction position in the content reproduction device 100B reaches the reproduction position obtained in Step S401.

When the reproduction position obtained in Step S401 is reached (Yes in S402), the content reproduction device 100B displays the message "Go for it!" obtained in Step S401 on a display screen that is displaying the content as shown in a display example (100B-2) in FIG. 14 (S403). It is to be noted that the display example (100B-2) includes, in addition to the message, the name of the user (user-1) who transmitted the message and information indicating how many seconds ago the message was created (eight seconds ago in this example).

Here, the content reproduction device 100B may immediately display the message received in Step S401 on the display screen without performing Step S402 in FIG. 13. In this case, the message inputted in the display example (100A-1) in FIG. 14 is displayed at timing of a display example (100B-1).

However, when contents of the received message is related to the content, for example, the content reproduction device 100B displays the message related to a part of the content which is not yet reproduced, which may cause the user of the content reproduction device 100B to lose interest in the content.

Thus, the content reproduction device 100B synchronizes the reproduction position of the content at the time when the received message is displayed with the reproduction position in the content reproduction device 100A at the time when the message is created. With this, the user of the content reproduction device 100B can view the message at appropriate timing, so that smooth communication is enabled between users.

In the above example, the case where the reproduction position in the content reproduction device 100B which receives the message is behind the reproduction position in the content reproduction device 100A which transmits the message is described. However, when the reproduction position in the content reproduction device 100B which receives the message is ahead of the reproduction position in the content reproduction device 100A which transmits the message, the content reproduction device 100B may immediately display the received message.

Moreover, the content reproduction device 1008 is capable of informing the user of the amount of delay of the current reproduction position by displaying information indicating how many minutes ago the message was created as in the display example (100B-2) shown in FIG. 14. It is to be noted that the "amount of delay" in this embodiment indicates difference of the reproduction positions between plural content reproduction devices (the content reproduction devices 100A and 100B in the above example) which reproduce the same content.

Figure 15:
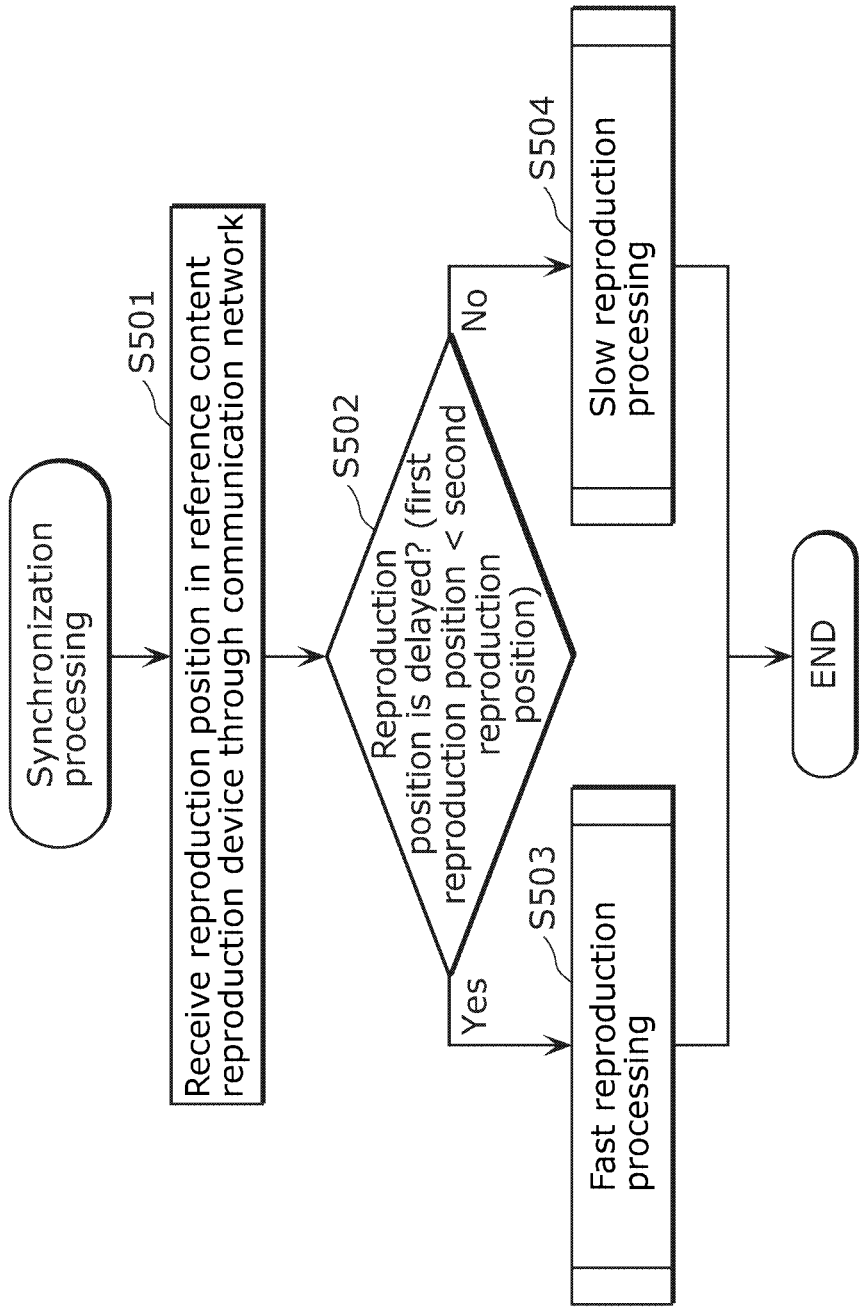
FIG. 15 is a flowchart showing synchronization processing according to Embodiment 2.

Next, processing for synchronizing the reproduction positions among the plural content reproduction devices which reproduce the same content are described with reference to FIG. 15. FIG. 15 is a flowchart showing the synchronization processing according to Embodiment 2.

For example, in the case where the content reproduction devices 100A, 100B, and 100C reproduce the same content obtained from the content distribution server 200, a description is given of processing for synchronizing the reproduction position in the content reproduction device 100A with a reproduction position in the content reproduction device 100C which is a reference content reproduction device. Since the content reproduction device 100B performs the same processing, the description is omitted.

First, the content reproduction device 100A receives a reproduction position in the reference content reproduction device from the reference content reproduction device through the communication network (S501). Here, the reference content reproduction device is a content reproduction device that is used as a reference in synchronizing the reproduction positions. That is, each of the content reproduction devices 100A and 100B synchronizes the reproduction position (a first reproduction position) of each of the content reproduction devices 100A and 100B to the reproduction position (a second reproduction position) in the content reproduction device 100C which is the reference content reproduction device.

Moreover, although a method of selecting the reference content reproduction device is not particularly specified, for example, a content reproduction device in which the reproduction position is most delayed or a content reproduction device in which the reproduction position is most advanced may be selected. In this regard, the content reproduction devices 100A, 100B, and 100C may exchange information indicating the reproduction position with each other and determine the content reproduction device in which the reproduction position is most delayed (or most advanced) as the reference content reproduction device.

Next, the content reproduction device 100A compares the first reproduction position (reproduction position in the content reproduction device 100A) and the second reproduction position (reproduction position in the reference content reproduction device) (S502). When the first reproduction position is behind the second reproduction position (Yes in S502), the content reproduction device 100A performs fast reproduction processing (S503). It is to be noted that since the fast reproduction processing in Step S503 is the same as the "Catch Up" processing in FIG. 7 except for a determination of whether or not the first reproduction position and the second reproduction position match in Step S105 in FIG. 7, the descriptions are not repeated.

On the other hand, when the first reproduction position is ahead of the second reproduction position (No in S502), the content reproduction device 100A performs slow reproduction processing (S504). It is to be noted that the slow reproduction processing in Step S504 is processing for reproducing a segment having a priority lower than or equal to the reference value at a third reproduction speed which is slower than a first reproduction speed in normal reproduction so that the first reproduction position comes close to the second reproduction position.

That is, the slow reproduction processing is the same as the "Catch Up" processing in FIG. 7 except for that a target media segment file is reproduced at slow speed in Step S102 in FIG. 7 and that it is determined whether or not the first reproduction position and the second reproduction position match in Step S105 in FIG. 7. Therefore, the descriptions are not repeated.

With the above configuration, the content reproduction devices 100A, 100B, and 100C are capable of reproducing the content in a synchronized manner, so that it is possible to effectively prevent the transmitted/received message from being displayed at unintended timing.

It is to be noted that even when each of the content reproduction devices 100A, 100B, and 100C performs the synchronization processing shown in FIG. 15, momentary differences are caused among the reproduction positions in the content reproduction devices 100A, 100B, and 100C. In this regard, for example, the content reproduction devices 100A, 100B, and 100C perform the synchronization processing shown in FIG. 15 at predetermined time intervals, and slight differences among the reproduction positions caused during the synchronization processing are compensated using processes shown in FIGS. 12 to 14.

Moreover, in this embodiment, a purpose is to synchronize reproduction positions in a group of the content reproduction devices 100A, 100B, and 100C among which the message is transmitted/received, and it is not necessarily needed to synchronize the reproduction position in each of the content reproduction devices 100A, 100B, and 100C with the distributable position in the content distribution server 200 as in Embodiment 1. In this regard, Embodiments 1 and 2 may be implemented in combination or separately.

Other Embodiments

Embodiments 1 and 2 have been described above as examples of techniques disclosed in the present application. However, the techniques in the present disclosure are not limited to these, but can be applicable to embodiments with appropriate modification, replacement, addition, omission, and others. Moreover, it is also possible to form a new embodiment by combining constituent elements described in the above Embodiments 1 and 2.

(1) Each of the above-described devices may be implemented using, specifically, a computer system including a microprocessor, a ROM, a RAM, a hard disk unit, a display unit, a keyboard, a mouse, and the so on. A computer program is stored in the RAM or hard disk unit. The respective devices achieve their functions through the microprocessor's operation according to the computer program. Here, the computer program is configured by combining plural instruction codes indicating instructions for the computer for the purpose of achieving predetermined functions.

(2) A part or all of the constituent elements constituting the respective devices may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the ROM. The System-LSI achieves its function through the microprocessor's operation such as calculation according to the computer program which has been loaded from the ROM to the RAM by the microprocessor.

(3) A part or all of the constituent elements constituting the respective devices may be configured as an IC card which can be attached and detached from the respective devices or as a stand-alone module. The IC card or the module is a computer system configured from a microprocessor, a ROM, a RAM, and the so on. The IC card or the module may also include the above-described super-multi-function LSI. The IC card or the module achieves its function through the microprocessor's operation according to the computer program. The IC card or the module may also be implemented to be tamper-resistant.

(4) The present disclosure may be implemented using the above described methods. Moreover, the present disclosure may be implemented using a computer program for realizing these methods using a computer, and may also be implemented using a digital signal including the computer program.

Furthermore, the present disclosure may also be implemented by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present disclosure may also include the digital signal recorded in these recording media.

Furthermore, the present disclosure may also be implemented by the transmission of the above-described computer program or digital signal via a telecommunication line, a wireless or wired communication line, a network represented by the Internet, a data broadcast and so on.

The present disclosure may also be a computer system including a microprocessor and a memory, in which the memory stores the computer program and the microprocessor operates according to the computer program.

Furthermore, by transferring the program or the digital signal by recording onto the above-described recording media, or by transferring the program or digital signal via the aforementioned network and the like, execution using another independent computer system is also made possible.

(5) The above-described embodiments and modifications may be combined.

The embodiments are described above as examples of techniques in the present disclosure. For this purpose, the accompanying drawings and the detailed descriptions are provided.

Thus, the constituent elements described in the accompanying drawings and the detailed descriptions include not only constituent elements essential to solve the technical problem but constituent elements that are inessential to solve the technical problem. Therefore, the inessential constituent elements should not be regarded as essential only because the inessential constituent elements are described in the accompanying drawings and the detailed descriptions.

Moreover, since the above embodiments are for illustrating the technique in the present disclosure, various modifications, replacements, additions, omissions, and others within the scope of the Claims and their equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a content reproduction device for reproducing content that is obtained through a communication network. Specifically, the present disclosure is applicable to a television receiver, a tablet terminal, a smart phone, a set top box, and others.

The invention claimed is:

1. A content reproduction device for reproducing content, the device comprising:
   an obtaining unit configured to obtain the content including plural segments on a per segment basis from a server through a communication network, each of the segments being assigned with a priority; and
   a reproduction controlling unit configured to reproduce the content on the per segment basis by displaying the content obtained by the obtaining unit on a display device on the per segment basis,
   wherein the reproduction controlling unit is configured to control reproduction of a target segment based on an amount of delay and a priority of the target segment, the amount of delay being a difference between a distributable position indicating a position of a latest segment distributable by the server and a first reproduction position in the content that is currently reproduced.

2. The content reproduction device according to claim 1, wherein the reproduction controlling unit is configured to control the reproduction of the target segment to bring the first reproduction position close to the distributable position when the amount of delay exceeds a predetermined threshold value and the priority of the target segment is lower than or equal to a reference value.

3. The content reproduction device according to claim 2, wherein the reproduction controlling unit is configured to increase a reproduction speed of the target segment to gradually bring the first reproduction position close to the distributable position.

4. The content reproduction device according to claim 3, wherein the reproduction controlling unit is configured to increase the reproduction speed of the target segment as the priority of the target segment decreases.

5. The content reproduction device according to claim 2, wherein the reproduction controlling unit is configured to skip reproduction of the target segment between a current segment including the first reproduction position and the latest segment to bring the first reproduction position close to the distributable position.

6. The content reproduction device according to claim 2, further comprising
   an input unit configured to receive an input from a user,
   wherein the reproduction controlling unit is configured to start bringing the first reproduction position close to the distributable position at a time when an input of a synchronization instruction for synchronizing the first reproduction position with the distributable position is received by the input unit.

7. The content reproduction device according to claim 6, wherein the reproduction controlling unit is configured to:
   display the amount of delay on the display device when the amount of delay exceeds a first threshold value;
   prompt the user to input the synchronization instruction through the display device when the amount of delay exceeds a second threshold value which is larger than the first threshold value; and
   automatically start bringing the first reproduction position close to the distributable position when the amount of delay exceeds a third threshold value which is larger than the second threshold value.

8. The content reproduction device according to claim 1, further comprising
   an input unit configured to receive an input from a user,
   wherein the reproduction controlling unit is further configured to:
   display, on the display device, information indicating a range of one or more segments that are obtainable from the server in the content; and
   display a segment including a specified reproduction position on the display device when the specified reproduction position is obtained through the input unit, the specified reproduction position being a position to start reproduction in the range displayed on the display device.

9. The content reproduction device according to claim 1, wherein the reproduction controlling unit is further configured to:
   obtain a second reproduction position in the same content obtained from the server and reproduced by an other content reproduction device; and
   control the reproduction of the target segment to bring the first reproduction position close to the second reproduction position when an amount of delay between the first reproduction position and the second reproduction position exceeds a predetermined threshold value and the priority of the target segment is lower than or equal to a reference value.

10. The content reproduction device according to claim 9, wherein the reproduction controlling unit is configured to increase a reproduction speed of the target segment to gradually bring the first reproduction position close to the second reproduction position when the first reproduction position is behind the second reproduction position.

11. The content reproduction device according to claim 9, wherein the reproduction controlling unit is configured to decrease the reproduction speed of the target segment to gradually bring the first reproduction position close to the second reproduction position when the first reproduction position is ahead of the second reproduction position.

12. The content reproduction device according to claim 9, further comprising:
   an input unit configured to receive an input of a message to be transmitted to the other content reproduction device; and
   a communication unit configured to transmit, to the other content reproduction device through the communication network, the message received by the input unit and information indicating a reproduction position in the content at a time when the message is received by the input unit.

13. The content reproduction device according to claim 9, further comprising
   a communication unit configured to receive a message to be displayed on the display device and a third reproduction position from the other content reproduction device through the communication network, the third reproduction position being a reproduction position in the content at a time when the message is displayed,
   wherein the reproduction controlling unit is configured to display the message received by the communication unit on the display device at a time when a part at the third reproduction position in the content is displayed on the display device, the third reproduction position being received by the communication unit.

14. A content reproduction system which includes a content distribution server for distributing content and a content reproduction device for reproducing the content,
   wherein the content reproduction device includes:
   an obtaining unit configured to obtain the content including plural segments on a per segment basis from the content distribution server through a communication network, each of the segments being assigned with a priority; and
   a reproduction controlling unit configured to reproduce the content on the per segment basis by displaying the content obtained by the obtaining unit on a display device on the per segment basis,
   wherein the reproduction controlling unit is configured to control reproduction of a target segment based on an amount of delay and a priority of the target segment, the amount of delay being a difference between a distributable position indicating a position of a latest segment distributable by the content distribution server and a first reproduction position in the content that is currently reproduced.

15. A content reproduction method for reproducing content, the method comprising:
   obtaining the content including plural segments on a per segment basis from a server through a communication network, each of the segments being assigned with a priority; and
   reproducing the content on the per segment basis by displaying the content obtained in the obtaining on a display device on the per segment basis,
   wherein in the reproducing, reproduction of a target segment is controlled based on an amount of delay and a priority of the target segment, the amount of delay being a difference between a distributable position indicating a position of a latest segment distributable by the server and a first reproduction position in the content that is currently reproduced.

* * * * *